Figure 1:
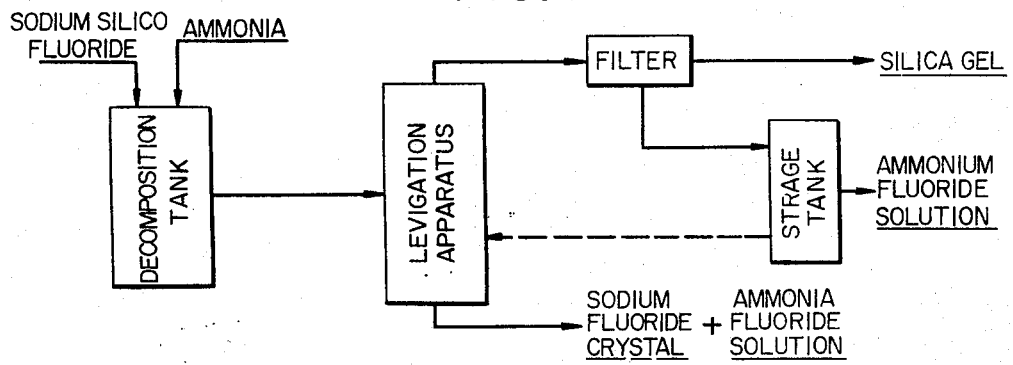

_United States Patent_ [19]

Satoh et al.

[11] 3,968,197

[45] July 6, 1976

[54] PROCESS FOR TREATING SODIUM SILICO FLUORIDE

[75] Inventors: Hirokazu Satoh, Tokyo; Akira Fujimura, Urawa, both of Japan

[73] Assignee: Onoda Chemical Industry Company, Limited, Tokyo, Japan

[22] Filed: Aug. 8, 1974

[21] Appl. No.: 495,833

Related U.S. Application Data

[63] Continuation of Ser. No. 39,965, May 25, 1970, abandoned.

[30] Foreign Application Priority Data

May 29, 1969  Japan................................ 44-41360

[52] U.S. Cl.............................. 423/339; 423/335; 423/470; 423/490
[51] Int. Cl.².................... C01D 3/04; C01B 33/16; C01C 1/16
[58] Field of Search ............ 423/335, 470, 490, 339

[56] References Cited

UNITED STATES PATENTS

| | | | |
|---|---|---|---|
| 3,021,194 | 2/1962 | Cunningham....................... | 423/335 |
| 3,563,699 | 2/1971 | Cuneo et al. ................... | 423/339 X |

FOREIGN PATENTS OR APPLICATIONS

| | | |
|---|---|---|
| 107,835 | 11/1927 | Austria |

_Primary Examiner_—Edward Stern
_Attorney, Agent, or Firm_—Fidelman, Wolffe & Waldron

[57] ABSTRACT

The invention relates to a process of the treatment of sodium silico fluoride. In the invention, sodium silico fluoride is decomposed with a relatively high concentration of an aqueous ammonium solution or an ammonia gas to produce a mixed aqueous slurry solution of ammonium fluoride containing sodium fluoride and silica gels as solid materials, the obtained mixed aqueous slurry solution is separated to the ammonium fluoride solutions containing sodium fluoride and silica gels, respectively, by means of a physical method and then sodium fluoride, silica gels and the aqueous ammonium fluoride solution are manufactured in high purity and good yield, respectively. In the other way, the mixture of sodium fluoride and silica gels are separated from said mixed aqueous slurry solution by means of the filter, washed with water and dried. The dried mixture is separated to sodium fluoride and silica gels by means of a physical method.

Further, ammonium fluoride in the mixed aqueous slurry solution manufactured according to said process may be decomposed with sodium hydroxide or sodium salt to sodium fluoride and an ammonium or ammonium salts solution to be used.

4 Claims, 3 Drawing Figures

PROCESS FOR TREATING SODIUM SILICO FLUORIDE

This is a continuation, of application Ser. No. 39,965, filed May 25, 1970, now abandoned.

The invention resides in the decomposition of sodium silico fluoride by means of a relatively high concentration of an aqueous ammonium solution or an ammonia gas.

The object of this invention resides in manufacturing pure sodium fluoride and silica gels as solid materials and an aqueous ammonium fluoride solution in high yield.

The other object of this invention resides in manufacturing pure sodium fluoride in a large crystalline form and a fine powder of silica gels, and separating them from an aqueous slurry solution of ammonium fluoride, respectively, in high efficiency by means of physical methods.

The another object of this invention resides in manufacturing a large crystal of pure sodium fluoride not bonding silica and silica gels having good dispersability in high yields and at same time.

The further object of this invention will be understood from the following descriptions.

Generally, sodium silico fluoride has been manufactured by treating silico fluoric acid produced in phosporic acid manufacturing industry, especially, in the manufacture of calcium superphosphate or phosphoric acid with an aqueous solution of sodium hydroxide. However, most of silico fluoric acid produced as by-product in the phosphoric acid manufacturing industry has been discarded in the form of waste gas or waste sludge of said industry, since an economical utilization of silico fluoric acid has not been found. Otherwise, the phosphoric acid fertilizer has been manufactured from the phosphoric acid containing silico fluoric acid without recovering it.

It is well known the fact that sodium silico fluoride, silica gels and ammonium fluoride are produced when sodium silico fluoride reacts with ammonia as depicted by Equation (I)

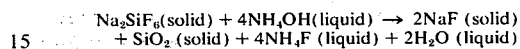

However, in ordinary process, said reaction has been accomplished by using a dilute aqueous ammonium solution in order to easily separate silica gels produced from the mixed solution of sodium fluoride and ammonium fluoride. It has been only studied to use the aqueous solution of sodium fluoride and ammonium fluoride for the manufacture of cryolite.

In order to find the economical use of sodium silico fluoride, many attempts have already been investigated and the most economical process has been found. This invention relates to a process characterized by decomposing sodium silico fluoride with a relatively high concentration of an aqueous ammonium solution or an ammonia gas while agitating, whereby forming the mixed aqueous slurry solution of ammonium fluoride containing sodium fluoride and silica gels as solid materials and then separating the decomposed products to each component thereof by means of physical methods.

The process mentioned above has been further developed to the improved process in which an aqueous solution of sodium hydroxide or sodium salt, namely, sodium sulfate or sodium chloride is added to said mixed slurry solution of ammonium fluoride containing sodium fluoride and silica gels while violently agitating to decompose ammonium fluoride to either sodium fluoride and ammonia or sodium fluoride and ammonium salt and then the mixed slurry solution obtained is treated to separate sodium fluoride, silica gels and ammonia or ammonium salt, respectively by means of physical methods.

The invention will be explained by the following examples and attached drawings.

The decomposition of sodium silico fluoride by an ammonium solution is shown as follows:

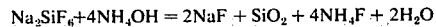

Since the solubility of sodium fluoride to the aqueous solution is relatively high, the concentrated aqueous ammonia solution or ammonia gas is preferable to be used in said reaction to recover sodium fluoride from the reaction mixture as crystal in good yield. However, it makes difficult to separate sodium fluoride from silica gels owing to forming a very fine crystal of sodium fluoride or a sodium fluoride crystal bonding silica on its surface.

In order to overcome the disadvantages, the interrelationship between the concentration of ammonium ions, namely total ammonium ions concentration coming from ammonium fluoride and free ammonia in the reaction medium and the solubility of sodium fluoride to the reaction medium has been examined. As shown in Table 1, when the total ammonium ions concentration in the reaction medium is high, namely the amount of ammonia used is that more than the stoichiometrical amount of ammonia necessary to decompose sodium silico fluoride and the concentration of an aqueous ammonium solution used is also relatively high, it has been found that the solubility of sodium fluoride in the reaction medium becomes small and also that to enhance the yield of sodium fluoride, the total ammonia concentration of the reaction medium is necessary to be more than 7.5% calculated on the weight basis of $NH_3$. Therefore, it is preferable to use the relative high concentration of an aqueous ammonium solution or an ammonia gas in the amount more than the stoichiometrical one of ammonia necessary to decompose sodium silico fluoride used. When an ammonium solution is used, the concentration of the aqueous ammonia solution is 18 ~ 50% as calculated on the weight basis of $NH_4OH$.

In this invention it is preferable to use sodium silico fluoride having the particle size of less than 250 μ in order to carry out the decomposition smoothly.

Table 1

| Concentration (wt%) of ammonium fluoride in the reaction mixture | Concentration (wt%) of free ammonia ($NH_4OH$) in the reaction mixture | Concentration (wt%) of total ammonia ($NH_3$) in the reaction mixture | Solubility (25°C) of sodium fluoride g/100g |
|---|---|---|---|
| 0 | 0 | 0 | 0 |
| 10 | 0 | 4.6 | 1.4 |
|  | 5 | 7.0 | 1.0 |
|  | 10 | 9.5 | 0.8 |
| 15 | 0 | 6.9 | 0.9 |
|  | 5 | 9.5 | 0.7 |
|  | 10 | 11.8 | 0.4 |
| 30 | 5 | 16.2 | 0.4 |
|  | 10 | 18.7 | 0.2 |
|  | 20 | 23.5 | 1.1 |
| 50 | 0 | 22.9 | 0.2 |

Table 1-continued

| Concentration (wt%) of ammonium fluoride in the reaction mixture | Concentration (wt%) of free ammonia (NH₄OH) in the reaction mixture | Concentration (wt%) of total ammonia (NH₃) in the reaction mixture | Solubility (25°C) of sodium fluoride g/100g |
|---|---|---|---|
| | 10 | 27.8 | 0.1 |

The process of this invention may be accomplished by means of a batch process in which sodium silico fluoride is added to a relatively high concentration of an aqueous ammonium solution, or a relatively high concentration of an aqueous ammonium solution or an ammonia gas is introduced into the aqueous slurry solution of sodium silico fluoride. Said process may also be accomplished by means of the continuous process in which the relatively high concentration of the aqueous ammonium solution or the ammonia gas and the aqueous slurry solution of sodium silico fluoride, or the relatively high concentration of the aqueous ammonium solution and sodium silico fluoride powder are simultaneously added.

According to the reaction condition, a sodium fluoride crystal bonding silica on its surface, a very fine crystal of sodium fluoride or hydrated silica gels coagulated may be formed and it may result in difficult to separate sodium fluoride and hydrated silica gels in high yield without any depression of purity thereof by the physical method. In this case, the separated silica gels includes sodium fluoride solution, and said sodium fluoride can be separated from silica gels by washing it with water, and the separated sodium fluoride includes silica gels and said silica gels can be eliminated with sodium hydroxide to rise the purity of silica gels or sodium fluoride, but, said process are not only troublesome but also uneconomical one.

Thus, it has been found by us to manufacture large crystals of sodium fluoride and fine powder of silica gels in high yield by decomposing sodium silico fluoride with the relatively high concentration of the aqueous ammonium solution or the ammonia gas while violently agitating in such reaction conditions that the total concentration of ammonium ions in the reaction medium reaches to more than 7.5% on the weight basis of $NH_3$ after the decomposition.

To obtain sodium fluoride and silica gels having the highest purity many attempts have been effected and led to the following results.

1. An aqueous slurry solution of sodium silico fluoride is decomposed with a high concentrated aqueous ammonium solution or an ammonia gas.
2. An aqueous ammonium solution or an ammonia gas is added slowly to the aqueous slurry solution containing sodium silico fluoride.
3. An agitating force to be used is quite enough to disperse the solid materials contained in the aqueous slurry solution.

The experimental results are explained as follows:
1. The influence of the order of adding the reactants on the purity of the products obtained.
   a. Experiment No. 1
   Three kg of sodium silico fluoride powders having a particle size of 100 μ were introduced in predetermined portions over 90 minutes into 10 l of a 25 wt. % aqueous ammonium solution (about 12.5 wt. % calculated on the basis of $NH_3$) filled into the cylindrical type reaction vessel having the capacity of 20 l and heated to 60°C, while agitating at the speed of 400 r.p.m. by means of a propeller type agitator. After charging, the reaction was continued for 30 minutes to complete the decomposition while agitating. Total concentration of ammonium ions in the solution mixture reached to 12.5% calculated on the weight basis of $NH_3$.
   b. Experiment No. 2
   Six l. of 42% aqueous ammonium solution were introduced into the aqueous slurry solution comprising 3.0 kg of sodium silico fluoride having the particle size of 100 and 1 of water filled in said reactor and heated to 60°C, in the predetermined portions over 90 minutes while violently agitating. After charging, the reaction was continued for 30 minutes to complete the decomposition while agitating. The total concentration of ammonium ions in the reaction mixture reached to 12.5% calculated on the weight basis of $NH_3$. In two experiments, resulted sodium fluoride and silica gels were separated from the reaction mixture by means of a levigation apparatus at the same condition. Sodium fluoride and silica gels obtained were analysed to determine the silica content in sodium fluoride and the sodium fluoride content in silica gels respectively.

The results obtained are shown as follows:

Table 2

| | $SiO_2$% in NaF | NaF% in $SiO_2$ |
|---|---|---|
| Exp. No. 1 | 15.6 | 10.6 |
| Exp. No. 2 | 0.9 | 1.5 |

It has been considered from the result of the experiment No. 1 that the concentration of free ammonia in the reaction medium has influence on the formation of the products especially silica gels and also that silica gels produced are not only insufficient to disperse one and one through the reaction medium, but also bonds to sodium fluoride produced with resultant of falling the purity of sodium fluoride since a high concentration of free ammonia in the medium at the beginning of the reaction gradually reduces to a low concentration in the lapse of the reaction. While it has been considered from the result of the experiment No. 2 that since the concentration of free ammonia in the reaction medium always maintains low while the reaction is proceeding and silica gels disperse one and one through the reaction medium, silica gels produced does not bond to the sodium fluoride crystals at once resulting in the formation of silica gels.

2. The influence of the rate of adding ammonia on the purity of the products obtained.

Seven kg of a 45% aqueous ammonium solution were added continuously to an aqueous slurry solution containing 3.0 kg of sodium fluoride and 3 l of water at 45°C while violently agitating at the rate as shown in the table 3. The agitating was continued until the decomposition reaction was completed. The reaction mixture was separated to the aqueous slurry solution containing sodium fluoride and ammonium fluoride and the aqueous slurry solution containing silica gels and ammonium fluoride by means of the levigation apparatus. The reaction solid products, namely sodium fluoride and silica gels were filtered from each slurry solution and dried to obtain the final products, respectively. The purity of the products is shown in Table 3.

Table 3

| The time required to adding an aqueous ammonium solution (minutes) | The retaining time after adding an aqueous ammonium solution (minutes) | SiO$_2$% in NaF | NaF% in SiO$_2$ |
|---|---|---|---|
| 15 | 60 | 12.6 | 15.4 |
| 30 | 60 | 10.8 | 16.1 |
| 60 | 30 | 1.3 | 5.5 |
| 120 | 30 | 0.5 | 1.5 |
| 180 | 20 | 0.2 | 0.9 |
| 240 | 20 | 0.4 | 2.0 |

From the experimental results, it has been found that if the concentration of aqueous ammonium solution used is about 45% by weight and the rate of adding said solution to the aqueous slurry is more than 60 minutes, the satisfactory results may be obtained. In the process of this invention, as the time required to adding the aqueous ammonium solution into the slurry solution depends on the concentration of ammonia, it is to be noted that if the concentration of the aqueous ammonium solution is higher than 45% weight, the time required to adding into the aqueous ammonium solution takes long. When the ammonia gas instead of the aqueous solution thereof is used, it is necessary to pay their attention so as to maintain the concentration of free ammonia contained in the reaction medium to the low range. The concentration of free ammonia in the reaction medium is preferable to be less than 5 wt.%.

3. The influence of the agitating power on the purity of the products obtained. Six point three kg of a 40% aqueous ammonium solution were continuously added to the aqueous slurry solution containing 2.5 kg of sodium silico fluoride and 3.5 kg of water filled in the cylindrical reactor at 43°C while agitating by means of the propeller type agitator over 120 minutes periods and the reaction was continued until the reaction was completed. After the reaction, the reaction mixture was separated to the aqueous slurry solution of sodium fluoride and ammonium fluoride and the aqueous slurry solution of silica gels and ammonium fluoride. The reaction solid products, namely sodium fluoride and silica gels were filtered from each of said slurry solution and dried to the final products, respectively. The purity of the products is shown in the table 4.

TABLE 4

| Revolution of the agitator (r.p.m.) | SiO$_2$ wt% in NaF | NaF wt in SiO$_2$ |
|---|---|---|
| 50 – 100 | 5.4 | 10.6 |
| 100 – 200 | 2.1 | 9.8 |
| 300 – 400 | 0.3 | 1.5 |
| 600 – 700 | 0.2 | 0.5 |
| 1000 – 1500 | 0.2 | 0.7 |

From the experimental results as shown in table 4, it has been found that if revolution of the agitator is more than 300 r.p.m., the purity of sodium fluoride and silica gels may be considerably improved. As the agitation effect may vary by virtue of the scale of the reactor used, the shape thereof, the type of agitating, the shape of propeller and the size thereof, the effect of agitation is not able to be estimated on the basis of the revolution of the agitator. At any way, the agitating power must be more than enough to disperse the solid materials contained in the aqueous slurry through the reaction medium.

The slurry solution of sodium silico fluoride used in the process of this invention may be not only aqueous slurry solution but also aqueous slurry solution of ammonium fluoride.

The water content of the aqueous slurry solution may be determined according to the concentration of an aqueous ammonia solution or an ammonia gas to be used, but it is preferable to be about 40 ~ 90 wt % on the basis of the aqueous slurry solution.

The concentration of the aqueous ammonium solution to be used is suitable to be more than 15% calculated on the weight basis of NH$_3$ and the total concentration of ammonium ions in the reaction mixture is more than 7.5% calculated on the weight basis of NH$_3$ when the reaction was completed.

When sodium silico fluoride is directly treated with the aqueous ammonia solution, the concentration of the ammonium solution to be used is suitable to be more than 7.5% calculated on the weight basis of NH$_3$.

It is preferable that the mole ratio of ammonia to sodium silico fluoride is more than 4:1. It is not preferable that said mole ratio is more than 8:1. In this case, the solubility of sodium fluoride in the reaction medium increases as the volume of the reaction medium increases in quantity and the yield of sodium fluoride formed decreases.

The reaction temperature is not necessary to define, but if the reaction temperature is too high, the solubility of sodium fluoride as well as silica to the reaction medium will increase, resulting the depression of the purity of ammonium fluoride solution and the yield of sodium fluoride and silica gels. Therefore, the reaction temperature is suitable to the less than 70°C. The agitating power is necessary to be more than the agitating power capable of dispersing the solid materials contained in the aqueous slurry through the aqueous slurry solution.

When ammonium fluoride in the aqueous slurry solution produced by the decomposition of sodium silico fluoride with ammonia is decomposed with sodium hydroxide or sodium salts to produce a sodium fluoride and ammonium solution or a ammonium salt solution. Sodium hydroxide or sodium salts to be used amounts to the stoichiometrical amount of ammonium fluoride thereof or a slight less amount than that of sodium hydroxide, and sodium chloride and sodium sulfate are used at the concentration of more than 10, 10 and 20 wt.%, respectively, or their solid states. The reaction conditions, namely agitating, the rate of adding etc. are same one as those of ammonia.

According to this invention, the products comprising sodium fluoride having large mono crystal more than 100 $\mu$, silica gels having good dispersability as well as the particle size less than 5 $\mu$ and the aqueous ammonium solution are not only manufactured, but also the products comprising sodium fluoride not bonding silica and silica gels less containing sodium fluoride are produced by selecting the reaction conditions. The products manufactured according to the process of this invention are able to easily separated by means of the levigation or sedimentation apparatus.

When the decomposition reaction of ammonium fluoride with sodium hydroxide or sodium salts is carried out in the aqueous slurry solution of ammonium fluoride comprising silica and sodium fluoride crystals, more larger crystals of sodium fluoride may be produced by the aid of the crystal kern of sodium fluoride already existing in the said slurry solution.

The process of this invention will be explained by means of the attached drawings.

Figure 2:
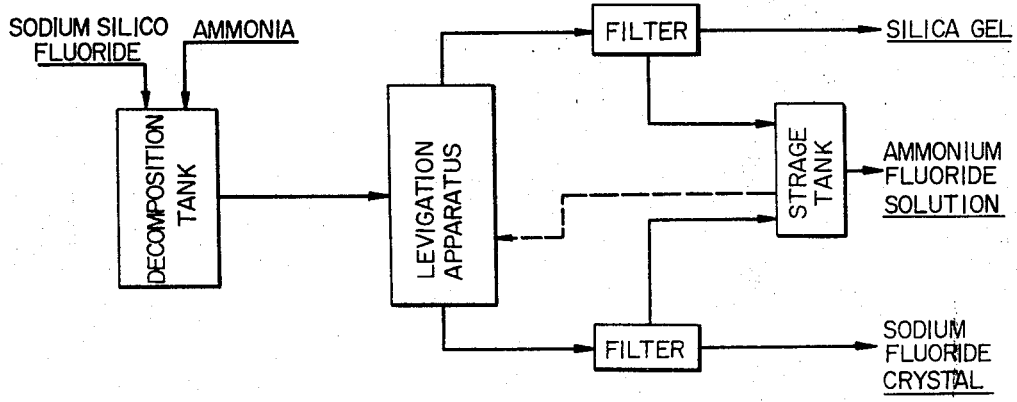
Figure 3:
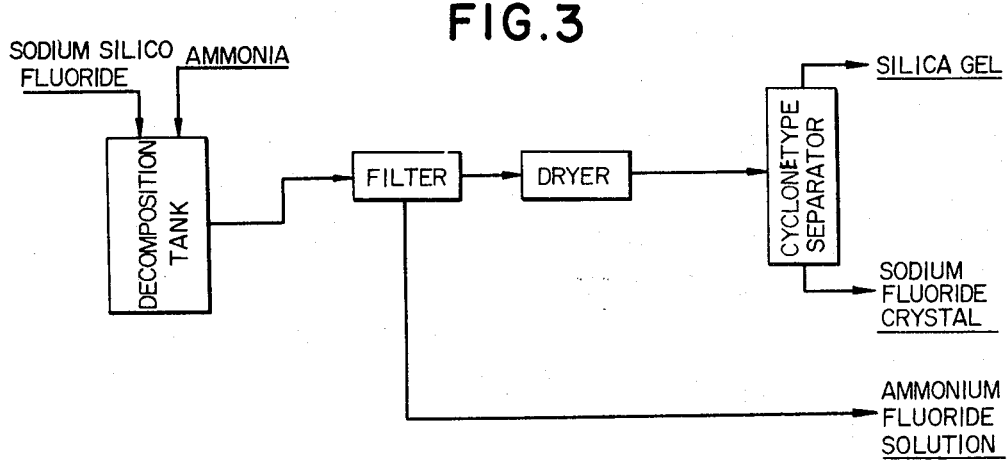

FIGS. 1, 2 and 3 show flow sheets of the process of this invention. The following examples and attached drawings will not limit the scope of this invention.

In FIG. 1, a sodium silico fluoride or its aqueous slurry solution and an aqueous ammonium solution or ammonia gas are continuously charged into the decomposition tank and decomposed while agitating, in other way, aqueous ammonium solution may be charged into the decomposition tank filled with an aqueous slurry solution of sodium silico fluoride while agitating, and sodium silico fluoride is decomposed to sodium fluoride, silica gels and ammonium fluoride. The aqueous slurry solution of ammonium fluoride produced comprising silica gels and sodium fluoride as solid materials is led to the middle portion of the levigation apparatus. From the neighborhood of the bottom of said apparatus, the aqueous ammonium fluoride solution obtained by the following procedure is introduced to form the upstream flow within said apparatus whereby silica gels contained in the aqueous slurry solution transfer upwardly and sodium fluoride crystals descend downwardly, thus, silica gels are discharged out from the top of the levigation apparatus in the form of the aqueous ammonium solution by means of the filter apparatus. Silica gels are washed with water and dried to make the final product. A part of the filtrate obtained is recycled to the levigation apparatus and the residual part thereof is used for various purposes.

In FIG. 2, a sodium silico fluoride or its aqueous slurry solution is decomposed with an aqueous ammonium solution or an ammonia gas in the decomposition tank as shown in FIG. 1. The aqueous slurry solution of ammonium fluoride produced comprising silica gels and sodium fluoride as solid materials is led to the middle portion of the levigation apparatus and silica gels are discharged out from the top of the levigation apparatus in the form of the aqueous slurry solution, filtered, washed with water and dried to make the final product as shown in FIG. 1. While sodium fluoride crystals precipitated in the bottom of said apparatus are drawn out in the form of the aqueous slurry solution, and separated from the aqueous ammonium fluoride solution by another filter apparatus, are washed with water and dried to make the final product. The filtrate obtained from the slurry solutions drawn out of the top and the bottom is gathered together, a part of the filtrate is recycled to the levigation apparatus and the residual part of the filtrate is used for various purposes.

In the FIG. 3, a sodium silico fluoride or its aqueous slurry solution is decomposed with an aqueous ammonium solution or an ammonia gas in the decomposition tank as shown in FIG. 1. The aqueous slurry solution of ammonium fluoride comprising silica gels and sodium fluoride produced is filtered by the filter apparatus and the mixture of silica gels and sodium fluoride is separated. After said mixture is washed with water and dried, said mixture is separated to sodium fluoride and silica gels by means of the cyclone type separator.

Since sodium fluoride obtained according to the process of this invention is high purity, sodium fluoride may be used in the industrial starting material, preservations for wood, fungicides and medical agents, while as silica gels obtained are high purity and fine particle size, they are used as a fuller of gum and synthetic resins and a drying agent. The aqueous ammonium fluoride solution may be used as the starting material for producing sodium fluoride, cryolite and the like, or may be treated to crystalline out and recover ammonium fluoride to use as an industrial chemical reagent.

In conclusion, sodium fluoride, silica gels and ammonium fluoride having wide utilization are produced by means of a simple process in high yield and high purity according to the process of this invention. The process of this invention has very important values in the industrial point of view.

EXAMPLE 1

Four kg/hour of a 20% aqueous ammonium solution (calculated on the weight basis of $NH_4OH$) were continuously charged to the decomposition tank together with 1.0 kg/hour of sodium silico fluoride in an aqueous slurry solution form of the concentration of 50 wt %. The decomposition reaction was carried out at 60°C while agitating at the revolution of about 60 r.p.m. by means of the propeller type agitator. The mean retention time in the reactor was about 3 hours. The aqueous slurry solution discharged from the reaction was introduced in the middle portion of the levigation tower. The aqueous ammonium fluoride solution produced from the following procedure was introduced into the levigation apparatus from the bottom thereof to form the upstream flow of about 20 cm per minute. The aqueous slurry solution of ammonium fluoride containing silica gels was drawn out from the top of said apparatus, while the aqueous slurry solution containing sodium fluoride was drawn out from the bottom of said apparatus. Sodium fluoride and silica gels contained in each aqueous slurry solution were filtered, washed with water and dried to recover sodium fluoride having a purity of better than 97% at the rate of 430 g/hour and silica gels having a purity of 99% at the rate of 320 g/hour respectively. 5.1 kg/hour of the total aqueous solution of amonium fluoride were recovered in the form of filtrate. The filtrate recovered comprised 14.8 wt % of ammonium fluoride and 0.4 wt % of sodium fluoride.

EXAMPLE 2

Four kg/hour of a 50% aqueous ammonium solution (calculated on the weight basis of $NH_4OH$) were continuously charged to the decomposition tank together with 2.0 kg/hour of sodium silico fluoride. The decomposition reaction was carried out at 90°C while agitating at the revolution of about 120 r.p.m. by means of the propeller type agitator. The mean retention time in the reactor was about an hour. The aqueous slurry solution discharged from the reactor was allowed to settle for 12 hours while cooling to 20°C and then separated to the aqueous slurry solution of ammonium fluoride containing silica gels and the aqueous slurry solution of ammonium fluoride containing sodium fluoride as shown in the example 1. The upstream flow rate in the levigation apparatus was 15 cm per minute. Sodium fluoride and silica gels were filtered from the slurry solution and washed with water, dried to recover silica gels having a purity of better than 99% at the rate of 640 g/hour and sodium fluoride having a purity of 98% at the rate of 890 g/hour respectively. The total filtrate of ammonium fluoride amounted to 4.4 kgs. said filtrate comprised 35.0 wt % of ammonium fluoride and 0.1 wt % of sodium fluoride.

EXAMPLE 3

One hundred kg of sodium silico fluoride having a purity of 98% and 100 l of water were charged in the cylindrical type reactor having the capacity of 600 l to form an aqueous slurry solution thereof. After the aqueous slurry solution was heated to 60°C while agitating at the revolution of 400 r.p.m. by means of the agitator of the propeller type, 200 l of a 45 wt % aqueous ammonium solution (about 22.5% calculated on the weight basis of $NH_3$) were added to the slurry solution in the predetermined portion over 90 minutes. After the reaction, the mixed slurry solution obtained containing sodium fluoride and silica gels was cooled to 30°C. Sodium fluoride and silica gels contained in the slurry solution were separated by means of the sedimentation. Sodium fluoride crystals contained in the aqueous ammonium fluoride slurry solution were separated, filtered, washed with water and dried to recover 41 kg of sodium fluoride having a purity of better than 99 wt % and the crystalline size of 100 ~ 500 $\mu$ and 31 kg of silica gels (containing 5% $H_2O$) having an purity of 100% and the particle size of less than 3 $\mu$ respectively. The volume of aqueous ammonium fluoride solution obtained was 820 l and its concentration was 22%.

EXAMPLE 4

One hundred kg of sodium silico fluoride having a purity of 98% were charged to the reactor of the cylindrical type. After 300 l of water were added to said reactor, the slurry solution was heated to 55°C while violently agitating at the revolution of 500 r.p.m. by means of the agitator of the propeller type, and 45 kg of an ammonia gas were introduced into said solution in the predetermined portions over 90 minutes to carry out the reaction. After the reaction, 175 kg of a 48% sodium hydroxide solution were added to said slurry solution in the predetermined portions to decompose ammonium fluoride. After the reaction, the aqueous slurry solution was cooled to 30°C and introduced into the levigation apparatus to separate the aqueous ammonium solution containing sodium fluoride crystals and the aqueous ammonium solution containing silica gels. Each of said aqueous slurry solutions was filtered, and sodium fluoride crystals and silica gels obtained were washed with water and dried to recover 120 kg of sodium fluoride crystals having the crystalline size of 100 ~ 500 and a purity of better than 99% and 33 kg of silica gels (containing 7% $H_2O$) having a purity of 100% and the particle size of less than 3 $\mu$ respectively. The volume of the aqueous ammonium solution obtained was 450 l and its concentration was 16 wt % (calculated on the basis of $NH_4OH$).

EXAMPLE 5

The aqueous slurry solution of ammonium fluoride containing sodium fluoride and silica gels produced at Example 1 was introduced in the filter apparatus. The mixture of sodium fluoride and silica gels was separated, washed with water and dried. The obtained mixture was then introduced in the cyclon type separator. Sodium fluoride having a purity of better than 98% at the rate of 430 g/hour and silica gels having a purity of 99% at the rate of 320 g/hour were obtained and 5.1 kg/hour of the total aqueous solution of ammonium fluoride was recovered.

EXAMPLE 6

One hundred kg of sodium silico fluoride having a purity of 98% were charged to the reactor of the cylindrical type. After 200 l of water were added to the reactor, the slurry solution was heated to 55°C while violently agitating at the revolution of 500 r.p.m. by means of the agitator of the propeller type, and 45 kg of an ammonia gas were introduced into said solution in the predetermined portions over 90 minutes to carry out the reaction. After the reaction, 175 kg of a 30% sodium chloride solution were added to said slurry solution in the predetermined portions to decompose ammonium fluoride. After the reaction, the aqueous slurry solution was cooled to 30°C and introduced into the levigation apparatus to separate the aqueous slurry solution containing sodium fluoride crystals and the aqueous ammonium chloride solution containing silica gels. Each of said aqueous slurry solutions was filtered and sodium fluoride crystals and silica gels obtained were washed with water and dried to recover 115 kg of sodium fluoride crystals having the crystalline size of 100 ~ 150 $\mu$ and a purity of better than 99% and 33 kg of silica gels (containing 7% $H_2O$) having a purity of 100% and the particle size of less than 3 $\mu$, respectively. The volume of the aqueous ammonium chloride solution was 610 l and its concentration was 16 wt %.

What is claimed is:

1. In the process of reacting sodium silicofluoride having a particle size of less than 250 microns and ammonia in an aqueous medium to produce silica, sodium fluoride and ammonium fluoride, the improvement comprising:
    a. adding ammonia, in the form of a member selected from the group consisting of free ammonia gas and aqueous ammonium hydroxide having a concentration, calculated as free ammonia, of at least about 7.5 weight percent, at a rate such that the concentration of ammonium hydroxide in the reaction medium is less than about 5 weight percent over a period of at least about 60 minutes, until substantially all the sodium silicofluoride is reacted:
    b. agitating to a degree greater than that required to disperse sodium fluoride crystals and silica gel of said reaction medium produced in the course of said addition of ammonia and for a period of at least about 20 minutes after completion of said addition of ammonia:
    c. after completion of the reaction, adding a stoichiometric excess of said ammonia in an amount such that the total ammonium ion concentration consisting of ammonium fluoride and ammonium hydroxide in the reaction medium is more than 7.5 weight percent, calculated as free ammonia; and
    d. separating sodium fluoride crystals having a particle size of more than 100 microns and silica gel having a particle size of less than 5 microns thus prepared separately from ammonium fluoride solution.

2. The process of claim 1 wherein said member is aqueous ammonium hydroxide having a concentration, calculated as free ammonia, of about 15 to 45 weight percent.

3. The process of claim 1 wherein said ammonium fluoride is reacted with a member selected from the first group consisting of sodium hydroxide, sodium chloride, and sodium sulfate to produce sodium fluoride and an aqueous solution of the corresponding member selected from the second group consisting ammonium hydroxide, ammonium chloride, and ammonium sulfate.

4. The process of claim 3 wherein the member selected from said first group is added as an aqueous solution having a concentration of at least about 10 weight percent.

* * * * *